US005919557A

United States Patent [19]

Lorenz et al.

[11] Patent Number: 5,919,557

[45] Date of Patent: Jul. 6, 1999

[54] REACTIVE THERMAL TRANSFER MEDIUM WITH ENCAPSULATED EPOXY

[75] Inventors: Michael A. Lorenz, Miamisburg; John C. Rosenbaum, Dayton; Joseph D. Roth, Springboro, all of Ohio

[73] Assignee: NCR Corporation, Dayton, Ohio

[21] Appl. No.: 08/932,796

[22] Filed: Sep. 4, 1997

Related U.S. Application Data

[63] Continuation of application No. 08/644,557, May 10, 1996, abandoned.

[51] Int. Cl.[6] .............................. B32B 3/26; B41M 5/26; B41M 5/36

[52] U.S. Cl. ....................... 428/321.5; 428/195; 428/323; 428/327; 428/412; 428/480

[58] Field of Search ................................ 428/195, 321.5, 428/323, 327, 412, 480

[56] References Cited

U.S. PATENT DOCUMENTS

| | | | |
|---|---|---|---|
| 3,663,278 | 5/1972 | Blose et al. | 428/480 |
| 4,315,643 | 2/1982 | Tokunaga et al. | 428/484 |
| 4,403,224 | 9/1983 | Wirnowski | 346/1.1 |
| 4,463,034 | 7/1984 | Tokunaga et al. | 427/256 |
| 4,564,534 | 1/1986 | Kushida et al. | 427/256 |
| 4,628,000 | 12/1986 | Talvalkar et al. | 428/341 |
| 4,687,701 | 8/1987 | Knirsch et al. | 428/216 |
| 4,707,395 | 11/1987 | Ueyama et al. | 428/216 |
| 4,777,079 | 10/1988 | Nagamoto et al. | 428/212 |
| 4,778,729 | 10/1988 | Mizobuchi | 428/484 |
| 4,923,749 | 5/1990 | Talvalkar | 428/341 |
| 4,975,332 | 12/1990 | Shini et al. | 428/500 |
| 4,983,446 | 1/1991 | Taniguchi et al. | 428/216 |
| 4,988,563 | 1/1991 | Wehr | 428/341 |
| 5,128,308 | 7/1992 | Talvalkar | 503/201 |
| 5,240,781 | 8/1993 | Obata et al. | 428/488.4 |
| 5,248,652 | 9/1993 | Talvalkar | 503/201 |
| 5,328,754 | 7/1994 | Yuyama et al. | 428/212 |

FOREIGN PATENT DOCUMENTS

| | | | |
|---|---|---|---|
| 5-8565 | 1/1993 | Japan | 428/321.5 |

OTHER PUBLICATIONS

Patent Abstracts of Japan, vol. 010, No. 066 (m–461), Mar. 15, 1986 & JP 60 212389 A (Canon KK), 24 Oct. 1995.

Patent Abstracts of Japan, vol. 017, No. 286 (M–1422), Jun. 2, 1993 & JP 05 016533 A (Ricoh Co Ltd), Jan. 26, 1993.

Patent Abstracts of Japan, vol. 014, No. 081 (M0935), Feb. 15, 1990 & JP 01 295891 A (Ricoh Co Ltd), Nov. 29, 1989.

Patent Abstracts of Japan, vol. 013, No. 048 (M–793), Feb. 3, 1989 & JP 63 254093 A (Canon Inc), Oct. 20, 1988.

*Primary Examiner*—Bruce H. Hess
*Attorney, Agent, or Firm*—Richard J. Traverso

[57] ABSTRACT

There is provided by the present invention a thermal transfer medium which employs reactive components that crosslink when heated during image transfer to provide images with high scratch and smear resistance. The reactive components comprise an encapsulated liquid epoxy resin and a crosslinker which remain separate while incorporated within a thermal transfer layer until exposed to a thermal print head.

15 Claims, 1 Drawing Sheet

REACTIVE THERMAL TRANSFER MEDIUM WITH ENCAPSULATED EPOXY

This is a continuation of copending application Ser. No. 08/644,557 filed on May 10, 1996, now abandoned.

FIELD OF THE INVENTION

The present invention relates to thermal transfer printing wherein images are formed on a receiving substrate by heating extremely precise areas of a print ribbon with thin film resistors. This heating of the localized area causes transfer of ink or other sensible material from the ribbon to the receiving substrate. The sensible material is typically a pigment or dye which can be detected optically or magnetically.

BACKGROUND OF THE INVENTION

Thermal transfer printing has displaced impact printing in many applications due to advantages such as the relatively low noise levels which are attained during the printing operation. Thermal transfer printing is widely used in special applications such as in the printing of machine readable bar codes and magnetic alpha-numeric characters. The thermal transfer process provides great flexibility in generating images and allows for broad variations in style, size and color of the printed image. Representative documentation in the area of thermal transfer printing includes the following patents.

U.S. Pat. No. 3,663,278, issued to J. H. Blose et al. on May 16, 1972, discloses a thermal transfer medium comprising a base with a coating comprising of cellulose polymer, thermoplastic aminotriazine-sulfonamide-aldehyde resin, plasticizer and a "sensible" material such as a dye or pigment.

U.S. Pat. No. 4,315,643, issued to Y. Tokunaga et al. on Feb. 16, 1982, discloses a thermal transfer element comprising a foundation, a color developing layer and a hot melt ink layer. The ink layer includes heat conductive material and a solid wax as a binder material.

U.S. Pat. No. 4,403,224, issued to R. C. Winowski on Sep. 6, 1983, discloses a surface recording layer comprising a resin binder, a pigment dispersed in the binder, and a smudge inhibitor incorporated into and dispersed throughout the surface recording layer, or applied to the surface recording layer as a separate coating.

U.S. Pat. No. 4,463,034, issued to Y. Tokumaga et al. on Jul. 31, 1984, discloses a heat-sensitive magnetic transfer element having a hot melt or a solvent coating.

U.S. Pat. No. 4,628,000, issued to S. G. Talvalkar et al. on Dec. 9, 1986, discloses a thermal transfer formulation that includes an adhesive-plasticizer or sucrose benzoate transfer agent and a coloring material or pigment.

U.S. Pat. No. 4,687,701, issued to K. Knirsch et al. on Aug. 18, 1987, discloses a heat sensitive inked element using a blend of thermoplastic resins and waxes.

U.S. Pat. No. 4,707,395, issued to S. Ueyama et al., on Nov. 17, 1987, discloses a substrate, a heat-sensitive releasing layer, a coloring agent layer, and a heat-sensitive cohesive layer.

U.S. Pat. No. 4,777,079, issued to M. Nagamoto et al. on Oct. 11, 1988, discloses an image transfer type thermosensitive recording medium using thermosoftening resins and a coloring agent.

U.S. Pat. No. 4,778,729, issued to A. Mizobuchi on Oct. 18, 1988, discloses a heat transfer sheet comprising a hot melt ink layer on one surface of a film and a filling layer laminated on the ink layer.

U.S. Pat. No. 4,923,749, issued to Talvalkar on May 8, 1990, discloses a thermal transfer ribbon which comprises two layers, a thermosensitive layer and a protective layer, both of which are water based.

U.S. Pat. No. 4,975,332, issued to Shini et al. on Dec. 4, 1990, discloses a recording medium for transfer printing comprising a base film, an adhesives improving layer, an electrically resistant layer and a heat sensitive transfer ink layer.

U.S. Pat. No. 4,983,446, issued to Taniguchi et al. on Jan. 8, 1991, describes a thermal image transfer recording medium which comprises as a main component, a saturated linear polyester resin.

U.S. Pat. No. 4,988,563, issued to Wehr on Jan. 29, 1991, discloses a thermal transfer ribbon having a thermal sensitive coating and a protective coating. The protective coating is a wax-copolymer mixture which reduces ribbon offset.

U.S. Pat. Nos. 5,128,308 and 5,248,652, issued to Talvalkar, each disclose a thermal transfer ribbon having a reactive dye which generates color when exposed to heat from a thermal transfer printer.

And, U.S. Pat. No. 5,240,781, issued to Obata et al., discloses an ink ribbon for thermal transfer printers having a thermal transfer layer comprising a wax-like substance as a main component and a thermoplastic adhesive layer having a film forming property.

There are some limitations on the applications for thermal transfer printing. For example, the properties of the thermal transfer formulation which permit transfer from a carrier to a receiving substrate can place limitations on the permanency of the printed matter. Printed matter from conventional processes can smear or smudge, especially when subjected to a subsequent sorting operation. Additionally, where the surface of a receiving substrate is subject to scratching, the problem is compounded. This smearing can make character recognition such as optical character recognition or magnetic ink character recognition difficult and sometimes impossible. In extreme cases, smearing can make it difficult to read bar codes.

Many attempts have been made to provide high integrity thermal transfer printing which is resistant to scratching and smearing, some of which are described above. For example, it is generally known to those skilled in the art that resin binders and/or waxes with higher melting points can provide a higher degree of scratch and smear resistance. However, higher print head energies are necessary to achieve the desired flow to promote transfer and adhesion to a receiving substrate. In U.S. Patent Nos. 5,128,308 and 5,248,652 Talvalkar provides print with improved smear resistance without the need for higher print head energies by employing a thermal transfer formulation which contains thermally reactive phenolic resins and Leuco dyes. These reactive components are said to provide higher intensity print with improved resistance to scratch and smear. The reaction apparently immobilizes the dye. There is no indication the melting point or molecular weight of the resin binder are significantly affected.

Thermal transfer ribbons and reactive components that polymerize to provide scratch/smear/environmental resistant images have lead to stability problems. High molecular weight components have been used to minimize these stability problems but due to their slow reaction rate, a baking step after transfer is required to obtain scratch/smear/environmental resistant images immediately after printing.

There is a continuing effort to provide alternative thermal transfer media which can form printed images with high scratch and smear resistance using relatively low print head energies.

SUMMARY OF THE INVENTION

It is an object of the present invention to provide a thermal transfer medium which forms scratch and smear resistant images.

It is an additional object of the present invention to provide a thermal transfer medium which forms scratch and smear resistant images through the use of reactive binder components within one thermal transfer layer.

It is still another object of the present invention to provide a stable thermal transfer medium which forms scratch and smear resistant images through the use of reactive binder components which react rapidly during printing and at a slower rate after printing without baking.

It is still a further object of the present invention to provide a thermal transfer medium wherein the molecular weight of the binder increases rapidly during printing and at a slower rate after printing to form a scratch and smear resistant image.

These and other objects and advantages of the present invention will become apparent and further understood from the detailed description and claims which follow, together with the annexed drawings.

The above objects are achieved through the use of a thermal transfer medium of the present invention which comprises a flexible substrate with a thermal transfer layer deposited thereon which softens and flows at a temperature below 200° C., said thermal transfer layer comprising a thermoplastic resin binder which is solid at ambient temperature, an encapsulated epoxy resin which is liquid at ambient temperature and reactive at ambient temperature, a crosslinker which crosslinks the epoxy resins at ambient temperature and a sensible material, wherein the epoxy resin is encapsulated in a microcapsule which ruptures and releases the epoxy resin under the pressure of a thermal print head operating at a temperature from 50° C. to 200° C. The epoxy resin and crosslinker melt mix when exposed to the energy of a thermal print head and subsequently react.

DETAILED DESCRIPTION OF THE PREFERRED EMBODIMENTS

Figure 1:
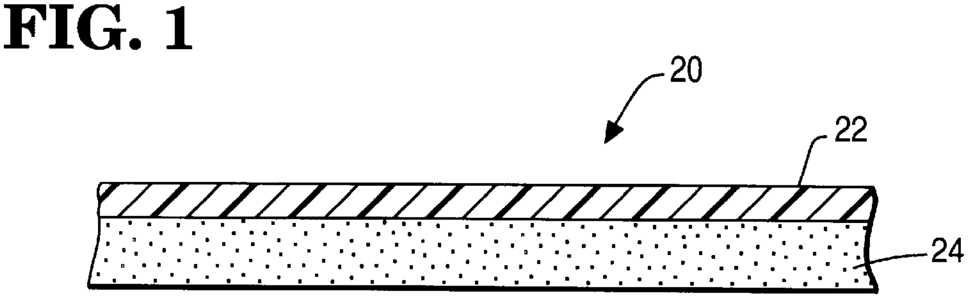
FIG. 1 illustrates a thermal transfer medium of the present invention.

Thermal transfer medium 20, as illustrated in FIG. 1, is a preferred embodiment of this invention and comprises substrate 22 of a flexible material which is preferably a thin smooth paper or plastic-like material and a thermal transfer layer 24. Tissue type paper materials such as 30–40 gauge capacitor tissue, manufactured by Glatz and polyester-type plastic materials such as 14–35 gauge polyester film manufactured by Dupont under the trademark Mylarm are suitable. Polyethylene naphthalate films, polyamide films such as nylon, polyolefin films such as polypropylene film, cellulose films such as triacetate film and polycarbonate films are also suitable. The substrates should have high tensile strength to provide ease in handling and coating and preferably provide these properties at minimum thickness and low heat resistance to prolong the life of heating elements within thermal print heads. The thickness is preferably 3 to 50 microns. If desired, the substrate or base film may be provided with a backcoating on the surface opposite the thermal transfer layer.

Thermal transfer layer 24 has a softening point below 200° C., preferably below 150° C. and most preferably from 50° C. to 80° C. Softening temperatures within this range enable the thermal transfer medium to be used in conventional thermal transfer printers, which typically have print heads which operate at temperatures in the range of 100° C. to 250° C., more typically, temperatures in the range of 100° C. to 150° C. The term “softening point” as used herein, refers to the temperature at which a solid material becomes malleable and flowable.

The thermal transfer layer comprises a thermoplastic resin matrix which is solid at ambient temperature, an encapsulated epoxy resin which is liquid at ambient temperature, a crosslinker for the epoxy resin, and a sensible material. The epoxy resin and crosslinker are selected so as to be reactive at ambient temperature, which will facilitate rapid reaction when the components are melt mixed from a printing operation. The crosslinker is preferably solid at ambient temperature so that it may be easily isolated from the encapsulated epoxy resin within the thermal transfer layer. If a solid, the crosslinker must have a softening point below 200° C., preferably below 150° C. and most preferably 50° C. to 80° C. It is contemplated that liquid crosslinkers can be dispersed in the thermoplastic resin matrix with or without encapsulation. The thermoplastic resin which forms the matrix also has a softening temperature below 200° C., preferably below 150° C., and most preferably in the range 50° C. to 80° C., consistent with the softening temperature requirements of the thermal transfer layer described above. Such softening temperatures allow the crosslinker to mix with the liquid epoxy resin when heated at temperatures in the range of 100° C. to 250° C., such as by a conventional thermal print head, allowing the crosslinking reaction to proceed. Where the thermoplastic resin matrix and/or crosslinker have a softening point above 100° C., consideration must be given to employ a print head with an operating temperature sufficiently high for mixing of the epoxy resin and crosslinker to occur.

The thermal transfer layer may be processed using a solvent, which can be aqueous or organic, with a boiling point below 200° C. The solvent need only solubilize the thermoplastic resin matrix during processing. Preferred solvents include ester solvents and mineral spirits. These solvents may suspend either the crosslinker or encapsulated epoxy resin to form a separate phase to ensure shelf stability. The solvent should not solubilize the encapsulating material which surrounds the liquid epoxy resin.

Examples of suitable thermoplastic resins are polyvinyl chloride, polyvinyl acetate, vinyl chloride-vinyl acetate copolymers, polyethylene, polypropylene, polyacetal, ethylenevinyl acetate copolymers, ethylene alkyl (meth) acrylate copolymers, ethylene-ethyl acetate copolymer, polystyrene, styrene copolymers, polyamide, ethylcellulose, epoxy resin, xylene resin, ketone resin, petroleum resin, rosin or its derivatives, terpene resin, polyurethane resin, polyvinyl butyryl, synthetic rubber such as styrene-butadiene rubber, nitrile rubber, acrylic rubber and ethylene-propylene rubber. Also suitable are polyvinyl alcohol, ethylene alkyl (meth)acrylate copolymers, styrene-alkyl (meth)

acrylate copolymer, saturated polyesters and the like. Suitable saturated polyesters are described in U.S. Pat. No. 4,983,446. It is recognized that mixtures of the above-identified resins can be used. In the viewpoint of transfer sensitivity, it is desirable for the thermoplastic resins to have a low softening temperature. From the viewpoint of image integrity, it is desirable for these resins to have a high softening temperature. The thermoplastic resin is preferably used in an amount of about 5 to 15 weight percent, particularly 10 weight percent based on the weight of total dry ingredients of the coating formulation which forms the thermal transfer layer.

The preferred epoxy resins suitable for use in this invention have at least two oxirane groups, $$\overset{\text{O}}{\text{—C—C—}},$$

so as to provide significant increases in molecular weight. It is also preferable for the epoxy resins to have hydroxy side groups where the crosslinker used will react with these groups. At least a portion of the epoxy resins used have two or more oxirane groups. The preferred resins include the low molecular weight epoxy novolak resins obtained by reacting epichlorohydrin with liquid phenol/formaldehyde resin or liquid cresol/formaldehyde resin. These resins are generally B-stage resins in a partial state of cure which have multiple epoxide groups.

Preferred epoxy resins also include low molecular weight polyglycidyl ether polymers obtained by reaction of epichlorohydrin with a liquid polyhydroxy monomer. These polymers are generally linear and have terminal epoxide groups. Low molecular weight polymers with aliphatic backbones are typically suitable if liquid at ambient temperature. These include those polyglycidyl ethers obtained by reaction of epichlorohydrin with 1,4-butanediol or trimethylol propane. The preferred epoxy resins discussed above are suitably reactive at ambient temperature. The epoxy resins most preferred are typically highly reactive so that the printed image will be scratch and smear resistant immediately.

The liquid epoxy resins are encapsulated within microcapsules which are stable within the thermal transfer layer at ambient temperature and rupture and release the epoxy resin upon the application of heat and pressure from a thermal print head, preferably at temperatures in the range of 50° C. to 200° C. The microcapsules are preferably of a size below 75 $\mu$m. The composition of the microcapsule shell, i.e., the encapsulating material, can vary widely from natural to synthetic materials which have a softening point below 200° C. To ensure compatibility with the matrix resin, the same resin can be used for the shell. Preferably, the encapsulating material is a thermoplastic resin with a softening point below 150° C., most preferably 50° C. to 80° C. An example of a suitable encapsulated epoxy resin is available from ND Industries, Inc. under the tradename ND Microspheres®.

Crosslinkers or hardeners suitable for use in this invention are those conventionally used to cure epoxy resins which satisfy the melting/softening point requirements discussed above. Liquid crosslinkers can be used and may be encapsulated with a material that will rupture consistent with the microcapsules that contain the epoxy resin. Preferred crosslinkers remain active at ambient temperature once the reaction is initiated. Suitable crosslinkers will react with the epoxide groups, hydroxyl groups or both. To improve shelf stability of the thermal transfer medium, it is preferable for solid crosslinkers to have an activation temperature in the range of 60° C. to 100° C. Crosslinkers with activation temperatures above 100° C. can be used, provided the activation temperature is below the operating temperature of the print head to be used.

Examples of suitable crosslinkers are polyamines which include prepolymers or oligomers of an amine (diamine), with or without another monomer, having at least two primary or secondary groups. These prepolymers/oligomers are often referred to as modified amines. If solid, they must meet the melting point/softening point requirements.

Examples of suitable modified amines are sold under the tradename Epi-cure P101 and Ancamine 2014FG sold by Shell Chemical Co. and Air Products, respectively. Other suitable crosslinkers include carboxylic acid functional polyester resins, phenol-formaldehyde resins and amino-formaldehyde resins. Included with the phenol-formaldehyde resins are resols and phenol-novolak resins.

Another component of the thermal transfer layer is a sensible material which is capable of being sensed visually, by optical means, by magnetic means, by electroconductive means or by photoelectric means. The sensible material is typically a coloring agent such as a dye or pigment or magnetic particles. Any coloring agent used in conventional ink ribbons is suitable, including carbon black and a variety of organic and inorganic coloring pigments and dyes, examples of which include phthalocyanine dyes, fluorescent naphthalimide dyes and others such as cadmium, primrose, chrome yellow, ultra marine blue, titanium dioxide, zinc oxide, iron oxide, cobalt oxide, nickel oxide, etc. In the case of the magnetic thermal printing, the thermal transfer coating includes a magnetic pigment or particles for use in imaging or in coating operations to enable optical, human or machine reading of the characters. The magnetic thermal transfer ribbon provides the advantages of thermal printing while encoding or imaging the substrate with a magnetic signal inducible ink. The sensible material is typically used in an amount from about 5 to 50 parts by weight of the total dry ingredients for the coating formulation which provides the thermal transfer layer.

To enhance the activity of the crosslinker, an accelerator may be incorporated in the thermal transfer layer. Examples include tertiary amines and TGIC (triglycidylisocyanurate). The accelerators may be liquid or solid at ambient temperature with a softening point below 200° C. The accelerator preferably functions at a temperature in the range of 20 to 250° C. to accelerate the crosslinking reaction.

The epoxy resin preferably comprises from 30–65% by weight based on the total weight of the thermal transfer layer, excluding solvent. The crosslinker preferably comprises 5 to 25% by weight of the thermal transfer layer, based on the total weight, excluding solvent.

The thermal transfer layer does not require the use of conventional waxes and plasticizers typically used in thermal transfer media, but their use is not excluded from the thermal transfer media of this invention.

The thermal transfer layer may contain conventional additives typically used in conventional thermal transfer media to aid in processing and performance of the thermal transfer layer. These include flexibilizers such as oil, weatherability improvers such as UV light absorbers, scratch and abrasion improvers such as polytetrafluoroethylene and micronized polyethylene and fillers. Amounts of up to 45 weight percent total additives, based on the total weight of the thermal transfer layer, excluding solvent, are suitable.

The thermal transfer layer can be obtained by preparing a coating formulation and applying it to a substrate by conventional coating techniques such as a Meyer Rod or like wire-round doctor bar set up on a typical solvent coating machine to provide the desired coating thickness which equates to a coating weight preferably between 1.9–4.3 gsm (grams/sq. meter). A temperature of approximately 100° F. to 150° F., preferably below 120° F., is maintained during the entire coating process. After the coating formulation is applied to the substrate, preferably 3 to 50 μm thick, the substrate is passed through a dryer at an elevated temperature to ensure drying and adherence of the coating 24 onto the substrate 22 in making the transfer ribbon 20, but without rupturing the microcapsules.

The thermal transfer layer can be fully transferred onto a receiving substrate such as paper or synthetic resin at a temperature in the range of 75° C. to 200° C. The reaction between the liquid epoxy resin and crosslinker is instantaneous and preferably proceeds at ambient temperature until complete. Although not preferred, the receiving substrate may be exposed to a post-bake of up to 24 hours to accelerate completion of the reaction and improve scratch resistance.

The coating formulation can be based on aqueous or organic solvents such as ester solvents and mineral spirits with a boiling point below 200° C., preferably in the range of 150° C. to 190° C. and preferably contains solids in an amount in the range of about 10 to 50 weight percent. Most preferably, the coating formulation contains about 30 percent solids. To prepare a suitable coating formulation which forms the thermal transfer layer, the thermoplastic binder is typically dissolved in a solvent. Once dissolved, the polymer solution is agitated and the remaining reactive components (the encapsulated epoxy resin and crosslinker) are dispersed therein. The mixture is transferred to an attritor and the sensible material is added thereto and agitated for about 2 hours at a temperature less than the activation temperature for the crosslinker and less than the temperature at which the microcapsules rupture. Where the ND Microspheres® and Epicure® P101 crosslinker are based, the temperature is maintained below 120° F.

The thermal transfer ribbon provides the advantages of the thermal printing. When the thermal transfer layer is exposed to the heating elements (thin film resistors) of the thermal print head, the thermoplastic resin binder and crosslinker melt mix and the microcapsules containing epoxy resin rupture. Reaction commences rapidly and the thermal transfer layer is transferred from the ribbon to the receiving substrate to produce a precisely defined image on the document.

Figure 2:
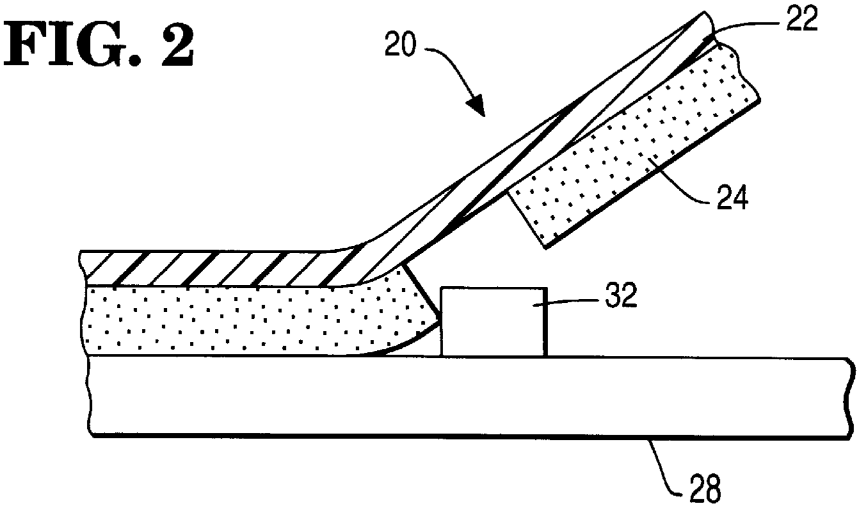
FIG. 2 illustrates a thermal transfer medium of the present invention after thermal transfer to a substrate.

FIG. 2 illustrates image 32 on receiving substrate 28 following transfer from thermal transfer layer 24 of thermal transfer medium 20. Once initiated, the reaction can proceed at room temperature.

Figure 3:
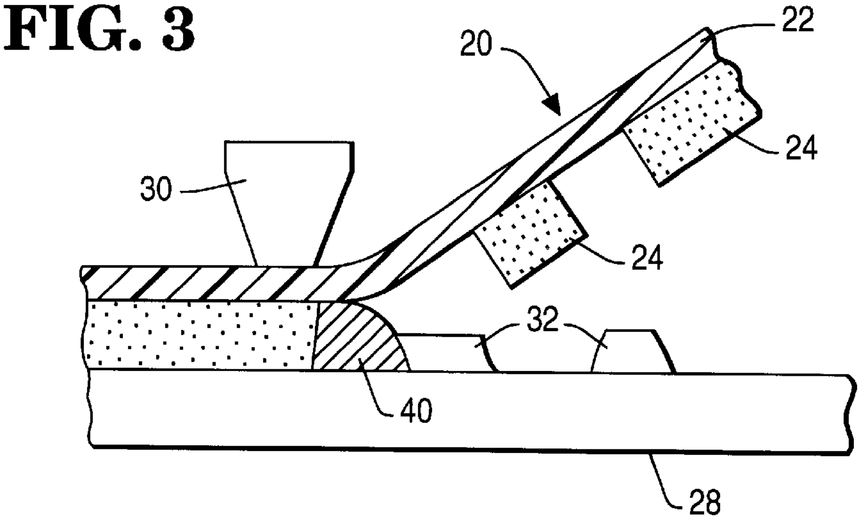
FIG. 3 illustrates a thermal transfer medium of the present invention in a printing operation wherein thermal transfer is taking place.

FIG. 3 shows use of thermal transfer medium 20 in a printing operation. More particularly, FIG. 3 shows the heating of thermal transfer medium 20 by print head 30 where rupture of the microspheres and mixing of the crosslinker and epoxy resin takes place during transfer of thermal transfer layer 24 onto receiving substrate 28. The heat from the print head 30 softens a portion of the thermal transfer layer and ruptures the capsules resulting in mixed portion 40. Reaction of the epoxy resin and crosslinker in mixed portion 40 results in image 32.

The images obtained from the thermal transfer layers of the present invention contain high molecular weight crosslinked epoxy resin and therefore, show high smear and scratch resistance.

The entire disclosure of all applications, patents and publications, cited above and below, are hereby incorporated by reference.

Without further elaboration, it is believed that one skilled in the art can, using the preceding description, utilize the present invention to its fullest extent. The following preferred embodiments are, therefore, to be construed as merely illustrative and not limitative of the remainder of the disclosure in any way whatsoever.

EXAMPLE 1

A coating formulation with the components within Table 1 was prepared by dissolving the EVA binder in solvent and adding the epoxy and modified polyamine while under agitation. The mixture was transferred to an attritor with a cooling jacket. The attritor was started and carbon black added, ensuring that the temperature of contents of the vessel did not exceed 120° F. The mixture was ground for two hours at 200–250 rpm.

TABLE 1

| | Use | % Dry | Dry (grams) | Wet (grams) |
|---|---|---|---|---|
| Mineral spirits | Solvent | NA | NA | 450.0 |
| Ethylene vinyl acetate (EVA)[1] | Binder | 10.0 | 15.0 | 15.0 |
| Encapsulated Epoxy Resin[2] | Epoxy | 65.0 | 97.5 | 97.5 |
| Modified polyamine[3] | Hardener | 10.0 | 15.0 | 15.0 |
| Carbon black[4] | Pigment | 15.0 | 22.5 | 22.5 |

The coating formulation is applied to polyester terephthalate (PET) film with coat weights in the range of 1.9–4.0 gms with conventional equipment.

MATERIALS

| | Chemical Name | Trade Name | Manufacturer | City | State |
|---|---|---|---|---|---|
| 1 | Ethylene vinyl acetate (EVA) | Escorene MV02514 | Exxon Chemical Co. | Houston | TX |
| 2 | Encapsulated epoxy | ND Microspheres | ND Industries, Inc. | Troy | MI |
| 3 | Modified polyamine | Epicure P101 | Shell Chemical Co. | Houston | TX |
| 4 | Carbon black | Raven 1255 | Columbian Chemicals Co. | Atlanta | GA |

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A thermal transfer medium comprising a flexible substrate and a thermal transfer layer positioned thereon which has a softening point below 200° C., said thermal transfer layer comprising a thermoplastic resin binder which is solid at ambient temperature and has a softening point below 200° C.;

an epoxy resin which is liquid at ambient temperature and reactive at ambient temperature;

a crosslinker which crosslinks the epoxy resin at ambient temperature once activated and has a softening point below 200° C.; and a sensible material, wherein the epoxy resin is encapsulated within a microcapsule which ruptures and releases the epoxy resin at a temperature from 50° C. to 200° C. under the pressure of a thermal print head.

2. A thermal transfer medium as in claim 1 which is processed with a solvent with a boiling point below 200° C.

which solubilizes the thermoplastic binder without solubilizing the microcapsules.

3. A thermal transfer medium as in claim 1, wherein the thermal transfer layer and crosslinker have a softening point in the range of 50° C. to 80° C.

4. A thermal transfer medium as in claim 1, wherein the thermal transfer layer contains from 30 to 65 weight % microcapsules with encapsulated epoxy resin and 5 to 25 weight % amine hardener, based on the total weight of the thermal transfer layer.

5. A thermal transfer medium as in claim 1, wherein the substrate is polyethylene terephthalate film and the thermal transfer layer has a coating weight of 1.9–4.3 gsm.

6. A thermal transfer medium as in claim 1, wherein the crosslinker is a solid amine hardener selected from prepolymers of diamines and diglycidyl ether bisphenol A.

7. A thermal transfer medium as in claim 6, which additionally contains an accelerator for the crosslinking reaction between the epoxy resin and amine hardener.

8. A thermal transfer medium as in claim 1, wherein the crosslinker is activated to initiate polymerization with the liquid epoxy resin at temperatures in the range of 60° C. to 100° C.

9. A thermal transfer medium as in claim 1, wherein the thermal transfer layer comprises encapsulated liquid epoxy resin within microcapsules of a size less than 75 μm.

10. A thermal transfer medium as in claim 1, wherein the thermal transfer layer comprises more than one crosslinker which is active at ambient temperature.

11. A thermal transfer medium as in claim 1, wherein the liquid epoxy resin is a low molecular weight polyglycidyl ether obtained by reaction of epichlorohydrin with a liquid polyhydroxy monomer.

12. A thermal transfer medium as in claim 1, wherein the crosslinker is liquid.

13. A thermal transfer medium as in claim 1 which is free of wax.

14. A thermal transfer medium as in claim 1 which is free of plasticizer.

15. A thermal transfer medium as in claim 1, wherein the microcapsules comprise an encapsulating material which comprises a thermoplastic resin with a softening point below 150° C.

* * * * *